(12) United States Patent
Bauchart et al.

(10) Patent No.: US 12,179,322 B2
(45) Date of Patent: Dec. 31, 2024

(54) RELEASE TOOL FOR USE WITH A PUSH-FIT VALVE

(71) Applicant: OVH, Roubaix (FR)

(72) Inventors: Gregory Francis Louis Bauchart, Wattrelos (FR); Ali Chehade, Templeuve (FR); Florian Courvoisier, Lyons (FR); Alexandre Alain Jean-Pierre Meneboo, Harnes (FR)

(73) Assignee: OVH, Roubaix (FR)

( * ) Notice: Subject to any disclaimer, the term of this patent is extended or adjusted under 35 U.S.C. 154(b) by 1170 days.

(21) Appl. No.: 16/997,535

(22) Filed: Aug. 19, 2020

(65) Prior Publication Data

US 2021/0268632 A1 Sep. 2, 2021

(30) Foreign Application Priority Data

Feb. 28, 2020 (EP) .................................. 20315028

(51) Int. Cl.
*B25B 27/10* (2006.01)
*B23P 19/00* (2006.01)
(Continued)

(52) U.S. Cl.
CPC .............. *B25B 27/10* (2013.01); *B23P 19/00* (2013.01); *B25B 7/12* (2013.01); *F16L 37/0915* (2016.05); *B25B 27/24* (2013.01); *F16L 33/035* (2013.01)

(58) Field of Classification Search
CPC . B25B 27/10; B25B 7/12; B25B 27/24; B23P 19/00; F16L 37/0915; F16L 33/035
See application file for complete search history.

(56) References Cited

U.S. PATENT DOCUMENTS 3,845,538 A * 11/1974 Demler, Sr. ............. B25B 27/16
  81/421
4,530,142 A   7/1985 Schiffer
(Continued)

FOREIGN PATENT DOCUMENTS

CN   103206587 A   7/2013
CN   105849452 A   8/2016
(Continued)

OTHER PUBLICATIONS

European Search Report with regard to the counterpart European Patent Application No. 20315028.9 completed Jun. 4, 2020.
(Continued)

*Primary Examiner* — Ryan J. Walters
(74) *Attorney, Agent, or Firm* — BCF LLP

(57) ABSTRACT

A release tool for use with a push-fit valve includes a fixed member and a movable member. The fixed member includes: a central portion defining a base aperture, the central portion being rotatably fixed relative to the valve when a valve lever base is received in the base aperture; and a guiding arm extending from a side of the central portion so as to extend along a side of a valve body. The movable member defines: a conduit aperture configured for a conduit to extend therethrough during use; and a guiding aperture receiving the guiding arm of the fixed member. To disconnect the conduit from the valve, the movable member is moved from the first position to the second position to push the release collar inwardly into the valve, causing a grab ring of the valve to release the conduit. The movable member is selectively retained in the second position.

15 Claims, 6 Drawing Sheets

(51) Int. Cl.
*B25B 7/12* (2006.01)
*F16L 37/091* (2006.01)
*B25B 27/24* (2006.01)
*F16L 33/035* (2006.01)

(56) References Cited

U.S. PATENT DOCUMENTS

| | | | | |
|---|---|---|---|---|
| 6,966,104 | B2* | 11/2005 | Gregel | ............... E04G 21/122 |
| | | | | 403/310 |
| 8,424,179 | B2* | 4/2013 | Webb | .................. B25B 27/10 |
| | | | | 72/409.14 |
| 8,434,205 | B2 | 5/2013 | Dewell | |
| 8,978,226 | B2* | 3/2015 | Kady | .................. B25B 5/068 |
| | | | | 7/125 |
| 9,573,259 | B1 | 2/2017 | Elsasser et al. | |
| 10,414,032 | B2* | 9/2019 | Yontz | .................. B25B 27/02 |
| 10,458,583 | B2 | 10/2019 | Parks | |
| 10,731,780 | B2* | 8/2020 | Bowman | ............. F16L 37/091 |
| 11,060,639 | B2* | 7/2021 | Cuvo | ..................... F16L 47/24 |
| 11,110,573 | B2* | 9/2021 | Faro, Sr. | ................ B25B 27/10 |
| 2008/0314205 | A1 | 12/2008 | Feliciano | |
| 2009/0229078 | A1 | 9/2009 | Rascon | |
| 2009/0230370 | A1 | 9/2009 | Delcoglin | |
| 2010/0088869 | A1 | 4/2010 | Webb et al. | |
| 2013/0086782 | A1 | 4/2013 | Dewell | |
| 2018/0133875 | A1 | 5/2018 | Faro | |
| 2019/0202040 | A1 | 7/2019 | Park | |

FOREIGN PATENT DOCUMENTS

| | | | |
|---|---|---|---|
| EP | 2320118 | A1 | 5/2011 |
| EP | 2435744 | A1 | 4/2012 |
| EP | 2435744 | B1 | 10/2013 |
| WO | 2008092682 | A1 | 8/2008 |
| WO | 2010136606 | A1 | 12/2010 |
| WO | 2017204818 | A1 | 11/2017 |

OTHER PUBLICATIONS

"Quick-Release Pliers for Push-Lock Fitting Removal", The Mill-Rose Company, https://cleanfit.com/quick-release-pliers.shtml, accessed Jan. 6, 2020, pdf 3 pages.

Notification of Grant with regard to the CN Patent Application No. 2020111317059 dated Jun. 7, 2023.

English Abstract for CN103206587 retrieved on Espacenet on Jul. 17, 2023.

English Abstract for CN105849452 retrieved on Espacenet on Jul. 17, 2023.

* cited by examiner

RELEASE TOOL FOR USE WITH A PUSH-FIT VALVE

CROSS-REFERENCE

The present application claims priority from European Patent Convention Application No. 20315028.9, entitled "Release Tool for use with a Push-Fit Valve,", filed on Feb. 28, 2020, the entirety of which is incorporated herein by reference.

FIELD OF TECHNOLOGY

The present technology relates to release tools for use with push-fit valves.

BACKGROUND

Push-fit valves are used in various applications to selectively open and close fluid flow therethrough. A push-fit valve advantageously allows quick connection and disconnection of a conduit (e.g., a hose). Notably, the push-fit valve is provided with grab rings at its ports that allow a conduit to be inserted into the valve but prevent its disconnection from the valve without the use of an appropriate release tool. In particular, to release the conduit from a push-fit valve, a release collar of the push-fit valve has to be pushed inwardly into the valve by a release tool to cause the corresponding grab ring to let go of the conduit and thus allow its removal from the valve.

Various types of release tools have been proposed for this purpose, including clamps and clips. However, conventional release tools typically require a user to keep applying a force on the release collar of the valve in order to disengage the conduit retained by the corresponding grab ring. While such conventional release tools may be satisfactory for simple applications, they can present problems in certain situations, including for example where a piece of equipment (e.g., a pumping station) is connected to various push-fit valves. Notably, if the user wants to remove the piece of equipment and thus has to disconnect it from the multiple push-fit valves, as the user only has two hands, he/she cannot disengage all of the push-fit valves from the piece of equipment at the same time and simultaneously remove the piece of equipment. Therefore, this task that is otherwise simple would require multiple people to be achieved. The problem is further exacerbated if the piece of equipment has to be disconnected with some frequency (e.g., for maintenance purposes).

There is therefore a desire for a release tool which can alleviate at least some of these drawbacks.

SUMMARY

It is an object of the present technology to ameliorate at least some of the inconveniences present in the prior art.

According to one aspect of the present technology, there is provided a release tool for use with a push-fit valve. The valve has a valve body defining a valve passage and a grab ring for retaining a conduit in fluid connection with the valve passage. The release tool includes a fixed member configured to be affixed to the valve and a movable member movably connected to the fixed member. The fixed member includes: a central portion defining a base aperture configured to receive therein a lever base of the valve, the base aperture being shaped such that, when the lever base of the valve is received in the base aperture, the central portion is rotatably fixed relative to the valve; and at least one guiding arm extending from a side of the central portion so that the at least one guiding arm extends along a side of the valve body when the release tool is mounted to the valve. The movable member is movable relative to the fixed member between a first position and a second position. The movable member defines: a conduit aperture configured for the conduit to extend therethrough during use, the conduit aperture being shaped and sized so as to permit the movable member to abut a part of the valve during use; and at least one guiding aperture receiving the at least one guiding arm of the fixed member. During use, in order to disconnect the conduit from the valve, the movable member is moved from the first position to the second position to push the part inwardly into the valve and thereby cause the grab ring of the valve to release the conduit. The movable member is selectively retained in the second position via interaction between the movable member and the at least one guiding arm.

In some embodiments, the conduit aperture is oblong. The conduit aperture has a diameter that is configured to be greater than a diameter of the conduit.

In some embodiments, the at least one guiding arm defines a notch. The movable member engages the notch and thereby interacts with the at least one guiding arm through the notch thereof to retain the movable member in the second position.

In some embodiments, the part of the valve that is abutted by the movable member is a release collar, the movable member being moved from the first position to the second position to push the release collar inwardly into the valve.

In some embodiments, the movable member is pivotable relative to the fixed member between the first and second positions.

In some embodiments, the central portion of the fixed member defines a connecting aperture. The movable member has an insert portion that is inserted into the connecting aperture so as to pivotably connect the movable member to the fixed member. The connecting aperture is shaped and sized so as to permit the insert portion of the movable member to pivot therein.

In some embodiments, the connecting aperture is generally rectangular.

In some embodiments, a portion of the at least one guiding arm is curved so as to guide pivoting motion of the movable member between the first and second positions.

In some embodiments, the fixed member and the movable member are sheet metal components.

In some embodiments, the at least one guiding arm is a portion of the fixed member that is bent relative to the central portion.

In some embodiments, the conduit aperture and the at least one guiding aperture of the movable member are defined in a common planar portion of the movable member.

In some embodiments, at least a majority of the movable member is planar.

In some embodiments, the release tool is configured to remain mounted to the valve both in the first and second positions.

In some embodiments, the at least one guiding arm includes a first guiding arm and a second guiding arm. The first guiding arm extends from a first side of the central portion. The second guiding arm extends from a second side of the central portion opposite the first side. The first and second guiding arms at least partially straddle the valve body of the valve when the release tool is mounted to the valve. The at least one guiding aperture includes a first guiding aperture and a second guiding aperture. The first guiding aperture receives the first guiding arm. The second guiding aperture receives the second guiding arm. The first guiding arm of the fixed member defines a key aperture extending therethrough. The second guiding arm of the fixed member defines a key aperture extending therethrough. The release tool also includes a key that is configured to be inserted through the key apertures of the first and second guiding arms when the movable member is in the second position to block the movable member from moving back to the first position.

In some embodiments, the base aperture includes a circular portion and a rectangular portion extending therefrom, the rectangular portion of the base aperture being shaped and sized to receive a key portion of the lever base therein so as to prevent rotation of the fixed member relative to the valve.

According to another aspect of the present technology, there is provided a system including the release tool as described above, and a push-fit valve including a valve body defining a valve passage therein, the valve body having a lever base on an outer side of the valve body; a lever rotatably connected to the lever base; a grab ring at least partly received in the valve passage, the grab ring being configured to retain a conduit inserted into the valve passage; and a release collar movable inwardly into and outwardly of the valve passage, the release collar being the part of the valve that is abutted by the release collar during use.

According to another aspect of the present technology, there is provided a method of releasing a conduit from a push-fit valve including providing a release tool including a fixed member and a movable member movably connected to the fixed member, the movable member defining a conduit aperture for the conduit to extend therethrough, the fixed member being affixed to the valve and rotatably fixed relative to the valve; moving the movable member toward the valve from a first position to a second position guided by a guiding arm of the fixed member, so as to push a part of the valve inwardly into the valve and thereby cause a grab ring of the valve to release the conduit; and retaining the movable member in the second position by engaging the movable member with the guiding arm of the fixed member such that contact between the movable member and the guiding arm retains the movable member in the second position.

According to another aspect of the present technology, there is provided a system including a push-fit valve and a release tool for selectively releasing the conduit from the valve. The valve includes: a valve body defining a valve passage therein, the valve body having a lever base on an outer side of the valve body; a lever rotatably connected to the lever base; a grab ring at least partly received in the valve passage, the grab ring being configured to retain a conduit inserted into the valve passage; and a release collar movable inwardly into and outwardly of the valve passage. The release tool includes a fixed member affixed to the valve and a movable member movably connected to the fixed member. The fixed member includes: a central portion defining a base aperture receiving the lever base of the valve therein, the base aperture being shaped such that the central portion is rotatably fixed relative to the valve; and at least one guiding arm extending from a side of the central portion so that the at least one guiding arm extends along a side of the valve body of the valve. The movable member is movable relative to the fixed member between a first position and a second position. The movable member defines: a conduit aperture configured for the conduit to extend therethrough during use, the conduit aperture being shaped and sized so as to permit the movable member to abut the release collar of the valve during use; and at least one guiding aperture receiving the at least one guiding arm of the fixed member. During use, in order to disconnect the conduit from the valve, the movable member is moved from the first position to the second position to push the release collar inwardly into the valve and thereby cause the grab ring of the valve to release the conduit. The movable member is selectively retained in the second position via interaction between the movable member and the at least one guiding arm.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

In the present description, various terms relating to spatial orientation such as "front", "rear", "top", "bottom", "left", "right", "upward", "downward", etc. will be used to provide a clear description of the present technology. However, it is understood that these terms are merely used to improve the clarity of the description and in no way are meant to be limiting in regard to orientation.

Figure 2:
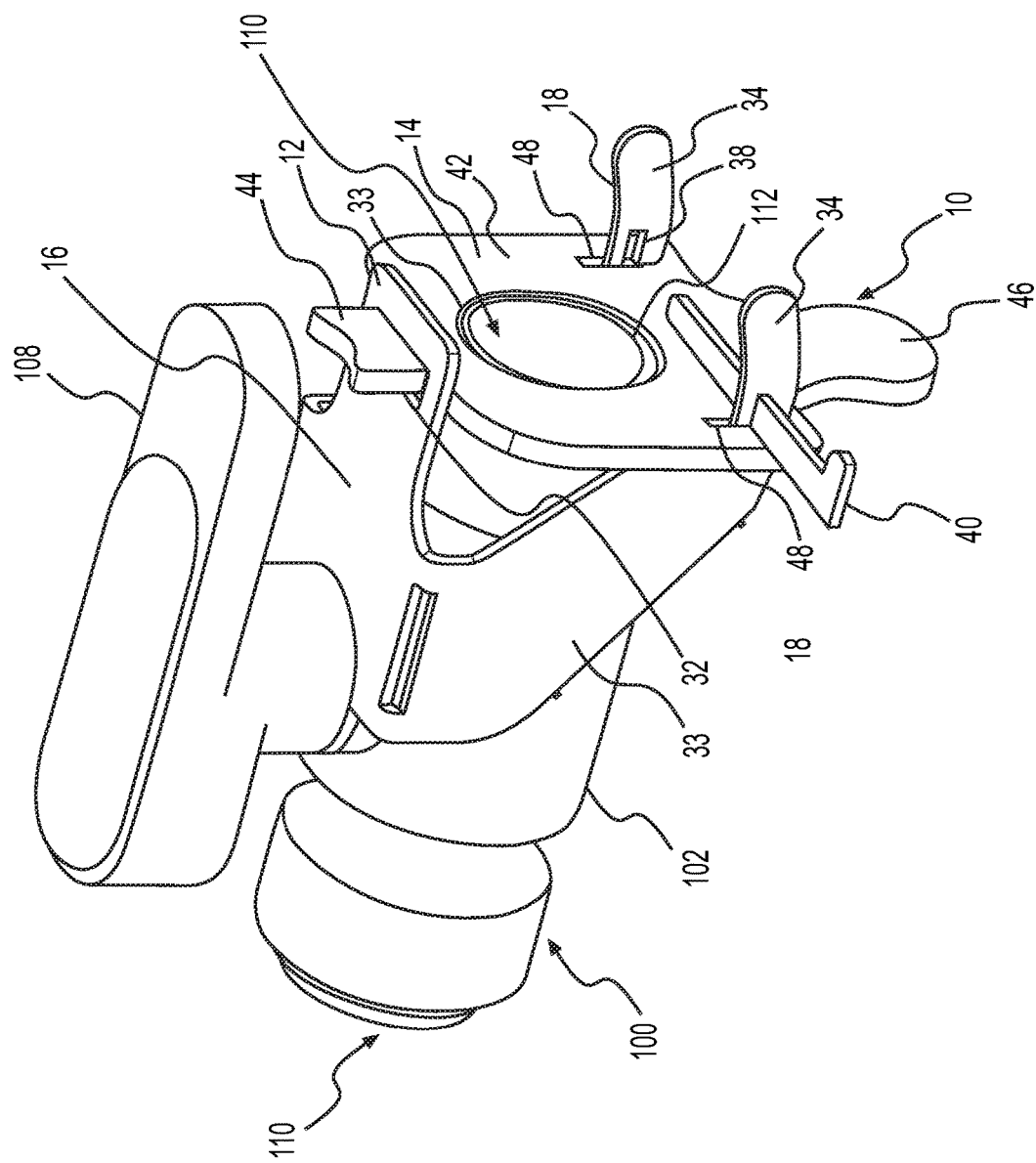
FIG. 2 is a perspective view, taken from a top, right side, of a system in accordance with an embodiment of the present technology, including a release tool mounted to a push-fit valve of the type shown in FIG. 1, the release tool shown in an engaged position.

FIG. 2 illustrates a release tool 10 in accordance with an embodiment of the present technology. The release tool 10 is used in conjunction with a push-fit valve 100 to selectively release a conduit 150 (shown in FIGS. 4 and 5) connected to the push-fit valve 100.

Figure 1:
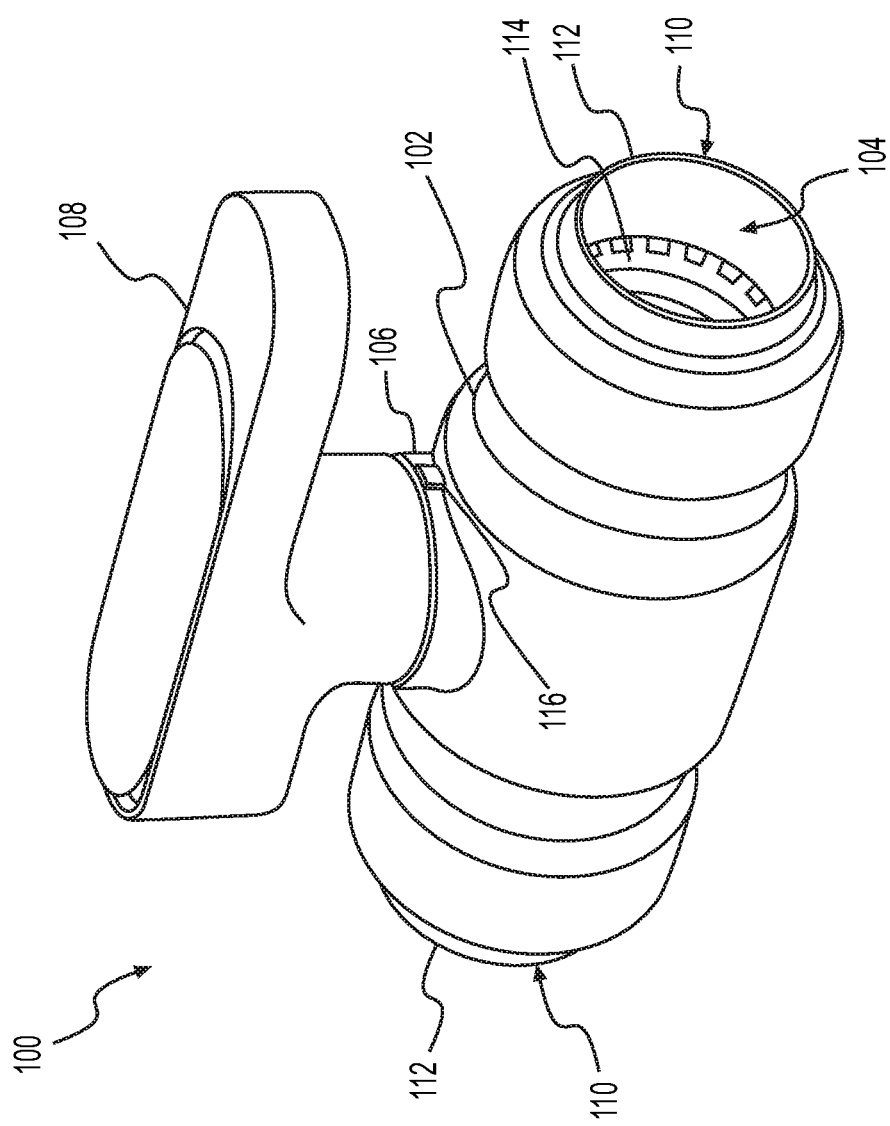
FIG. 1 is a perspective view of a push-fit valve as known in the art.

In this embodiment, the push-fit valve 100 is a two-way, two-port push-fit ball valve. This type of push-fit valve is commonly known in the art. For context, the push-fit valve 100 will be described herein with reference to FIG. 1 which best shows the push-fit valve 100. The push-fit valve 100 includes a valve body 102 defining a valve passage 104 therein through which fluid flows during use. The valve passage 104 extends between opposite ports 110 of the valve 100. On its outer side, the valve body 102 has a lever base 106 projecting upwardly for connection of a lever 108 thereto. Notably, the lever 108 is rotatably connected to the lever base 106. As is known, the push-fit valve 100 is operated by turning the quarter-turn lever 108 to selectively close or open fluid flow through the valve passage 104 of the valve 100. Notably, a ball (not shown) operatively connected to the lever 108 and disposed within the valve passage 104 rotates to allow or block fluid flow through the valve passage 104.

Each port 110 of the push-fit valve 100 is provided with a generally annular release collar 112 and a corresponding metallic grab ring 114. The grab ring 114 has multiple teeth which are configured to dig into and thus retain the corresponding conduit 150 (e.g., a plastic hose or a copper pipe). The release collar 112 is movable along an axial direction of the valve 100 (defined by the valve passage 104). In its resting position, the release collar 112 protrudes furthest from the valve passage 104. When the release collar 112 is pushed inwardly into the valve passage 104 with sufficient force, it abuts the grab ring 114 and causes the grab ring 114 to let go of the conduit 150.

The release tool 10 allows a user to disconnect the conduit 150 connected to the push-fit valve 100 by selectively pushing the corresponding release collar 112 inwards into the valve 100, which splays the grab ring 114 open thus causing the teeth of the grab ring 114 to release the conduit 150, allowing a user to remove the conduit 150 from the valve 100.

As shown in FIG. 2, the release tool 10 includes a fixed member 12 and a movable member 14 movably connected to the fixed member 12. As will be described in greater detail below, the movable member 14 is moved from a disengaged position (shown in FIGS. 4 and 5) to an engaged position (shown in FIGS. 2 and 3) to cause the grab ring 114 to free the conduit 150.

Figure 3:
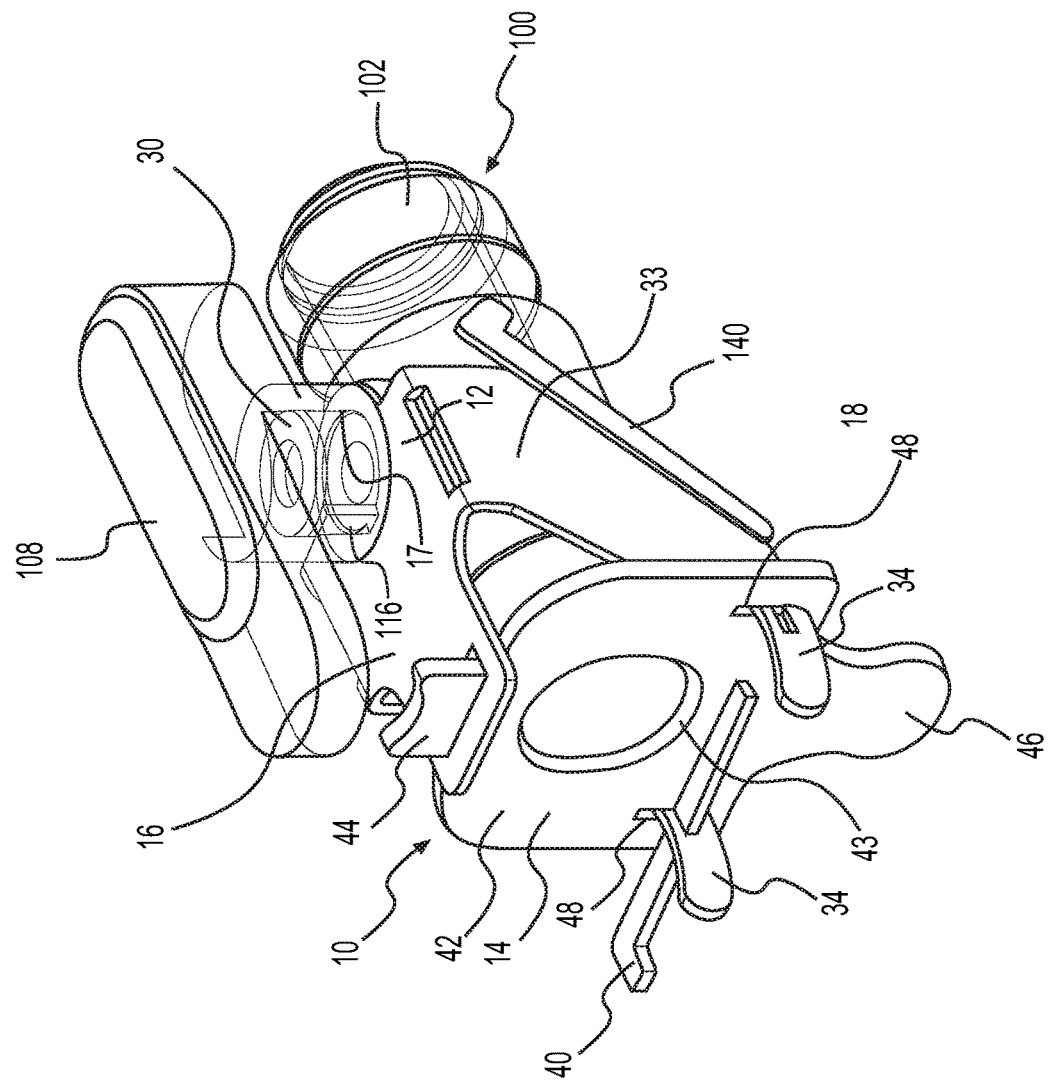
FIG. 3 is a perspective view, taken from a top, left side, of the system of FIG. 2, with the push-fit valve shown in transparency to expose inner members of the system, the release tool shown in the engaged position.
Figure 6:
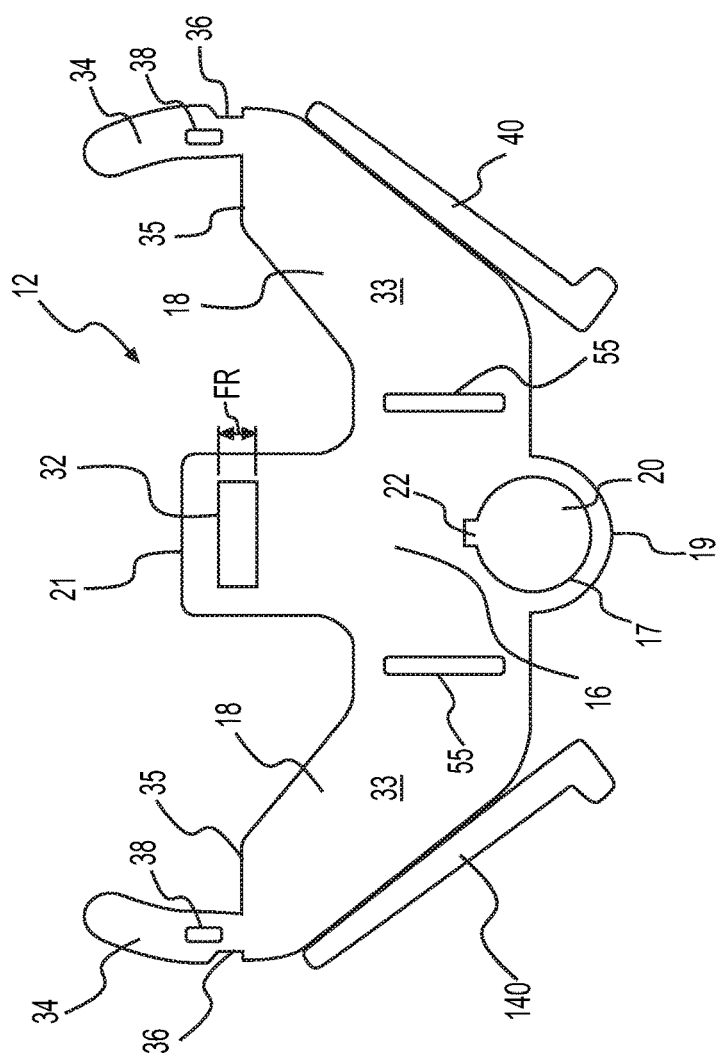
FIG. 6 is a top plan view of a fixed member of the release tool of FIG. 2 in a pre-bending state.

The fixed member 12, which is affixed to the valve 100, includes a central portion 16 and two guiding arms 18, each guiding arm 18 extending from opposite lateral sides of the central portion 16. As best shown in FIG. 6, the central portion 16 of the fixed member 12 defines a base aperture 17 near a rear end 19 thereof. As shown in FIG. 3, in use, the base aperture 17 receives therein the lever base 106 of the valve 100. The base aperture 17 is shaped such that, when the lever base 106 of the valve 100 is received in the base aperture 17, the central portion 16 is rotatably fixed relative to the valve 100. Notably, as best seen in FIG. 6, in this embodiment, the base aperture 17 includes a circular portion 20 and a rectangular portion 22 extending therefrom. The rectangular portion 22 is shaped and sized to receive therein a key portion 116 of the lever base 106 (shown in FIGS. 1 and 3) of the valve 100 so as to prevent rotation of the fixed member 12 relative to the valve 100. As can be seen in FIG. 3, once the fixed member 12 is in place so that the base aperture 17 receives the lever base 106 therein, a washer 30 is disposed atop the lever base 106 (to make up for a wall thickness of the fixed member 12) and the lever 108 of the valve 100 is disposed thereon so as to receive the lever base 106 in a bore of the lever 108. As such, part of the central portion 16 of the fixed member 12, around the base aperture 17, is sandwiched between the lever 108 and the valve body 102.

As best shown in FIG. 6, the central portion 16 also defines a connecting aperture 32 near a front end 21 thereof.

The connecting aperture 32 is configured to receive part of the movable member 14 therein. As will be described in greater detail below, this allows pivotably connecting the movable member 14 to the fixed member 12. In this embodiment, the connecting aperture 32 is generally rectangular.

The guiding arms 18 of the fixed member 12 are provided to guide the movement of the movable member 14 relative to the fixed member 12 between the disengaged and engaged positions. The guiding arms 18 of the fixed member 12 extend downwardly from either lateral side of the central portion 16. The guiding arms 18 are generally parallel to one another and perpendicular to the central portion 16. The guiding arms 18 thus straddle the valve body 102 (i.e., are disposed on either side of the valve body 102) when the release tool 10 is mounted to the valve 100. Moreover, as can be seen, the guiding arms 18 extend downwardly and forwardly from the lateral sides of the central portion 16. In particular, each guiding arm 18 has an upper portion 33 extending downwardly and forwardly from the central portion 16 and an end portion 34 which extends forwardly from a lower end of the upper portion 33. The upper portion 33 of each guiding arm 18 defines a shoulder 35 formed by a front edge thereof. The end portion 34 extends forwardly from the shoulder 35. The end portion 34 of each guiding arm 18 is curved which, as will be explained in more detail below, guides a pivoting motion of the movable member 14 relative to the fixed member 12. It is contemplated that, in other embodiments, only a lower surface of each end portion 34 could be curved.

Furthermore, as can be seen in FIG. 6, in this embodiment, the end portion 34 of each of the guiding arms 18 defines a notch 36 on the bottom side thereof such that the notch 36 faces downwardly. As will be described in more detail below, in this embodiment, the movable member 14 is selectively retained in the engaged position by interacting with the guiding arms 18 via the notches 36 thereof. In particular, the user can handle the movable member 14 to cause the notches 36 of the guiding arms 18 to cooperate with the movable member 14 to selectively retain the movable member 14 in the engaged position. It is contemplated that the movable member 14 could be retained in the engaged position in other ways in other embodiments. For instance, the guiding arms 18 could be provided with protrusions rather than notches.

In this embodiment, the end portion 34 of each of the guiding arms 18 also defines a key aperture 38 extending therethrough. The key apertures 38 of both guiding arms 18 are generally aligned with one another. Notably, as shown in FIGS. 2 and 3, in use, a key 40 of the release tool 10 is inserted through the key apertures 38 to prevent the movable member 14 from disengaging the engaged position. It is noted that the key 40 and key apertures 38 are optional and may be omitted in other embodiments.

Figure 7:
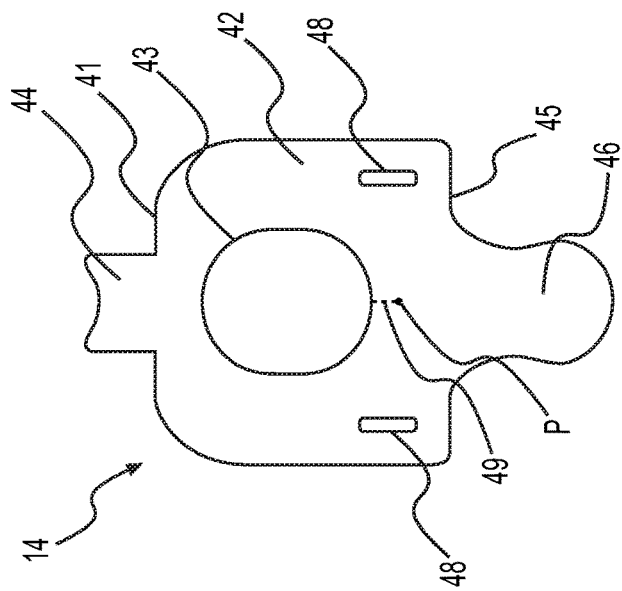
FIG. 7 is a front elevation view of a movable member of the release tool of FIG. 2.

As shown in FIG. 7, the movable member 14 includes a main portion 42, an insert portion 44 and a tongue portion 46. The insert portion 44 extends upwardly from an upper end 41 of the main portion 42 and is inserted into the connecting aperture 32 of the fixed member 12 in order to pivotably connect the movable member 14 to the fixed member 12. To allow the pivoting movement of the movable member 14 relative to the fixed member 12, the connecting aperture 42 is dimensioned such that the insert portion 44 has a certain amount of play when received therein. Particularly, a front-to-rear dimension FR of the connecting aperture 32 (shown in FIG. 6), measured parallel to the axial direction of the valve 100 as defined by the valve passage 104, is greater than a front-to-rear dimension of the insert portion 44. In other words, the front-to-rear dimension FR of the connecting aperture 32 is greater than a thickness of the movable member 14. Notably, as will be described in more detail below, the movable member 14 is made of sheet metal and therefore has a standard thickness throughout. For instance, a ratio of the front-to-rear dimension FR over the thickness of the insert portion 44 of the movable member 14 is greater than 1.5. For example, the ratio of the front-to-rear dimension FR over the thickness of the insert portion 44 of the movable member 14 may be between 1.5 and 2. This spacing between the insert portion 44 and the walls defining the connecting aperture 32 allows the insert portion 44 to be the fulcrum of rotation as the movable member 14 pivots between the disengaged and engaged positions.

The main portion 42 of the movable member 14 defines a conduit aperture 43 positioned generally centrally on the main portion 42. As shown in FIG. 2, the conduit aperture 43 is configured for the conduit 150 to extend therethrough and into the valve passage 104 of the valve 100. The conduit aperture 43 is shaped and sized so as to permit the part of the main portion 42 around the conduit aperture 43 to abut an end the release collar 112 of the valve 100 such that the movable member 14 forces the release collar 112 inwardly into the valve passage 104 when the movable member 14 is moved from the disengaged position to the engaged position. In this embodiment, the conduit aperture 43 is non-circular. In particular, in this embodiment, the conduit aperture 43 is oblong in shape, namely stadium shaped and has a stadium diameter that is greater than a diameter of the conduit 150 so as to allow the conduit 150 to extend through the movable member 14. The oblong, non-circular shape of the conduit aperture 43 allows a vertical movement of the movable member 14 between the engaged and disengaged positions.

It is contemplated that, in some embodiments, optionally, a washer through which the conduit 150 extends could be provided between the release collar 112 and the main portion 42 of the movable member 12 so as to distribute the force applied by the movable member 14 throughout the end of the release collar 112.

In addition to the conduit aperture 43, the main portion 42 of the movable member 14 also defines two guiding apertures 48 that receive respective ones of the guiding arms 18 of the fixed member 12 therein. In this embodiment, the guiding apertures 48 are slots, each having a length that is greater than the height of the end portion 34 of the corresponding guiding arm 18. Notably, as shown in FIG. 2, the end portions 34 of the guiding arms 18 are inserted into the guiding apertures 48.

The tongue portion 46 of the movable member 14 extends downwardly from a lower end 45 of the main portion 42. The tongue portion 46 is configured for handling by a user so as to move the movable member 14 between the disengaged and engaged positions.

Figure 4:
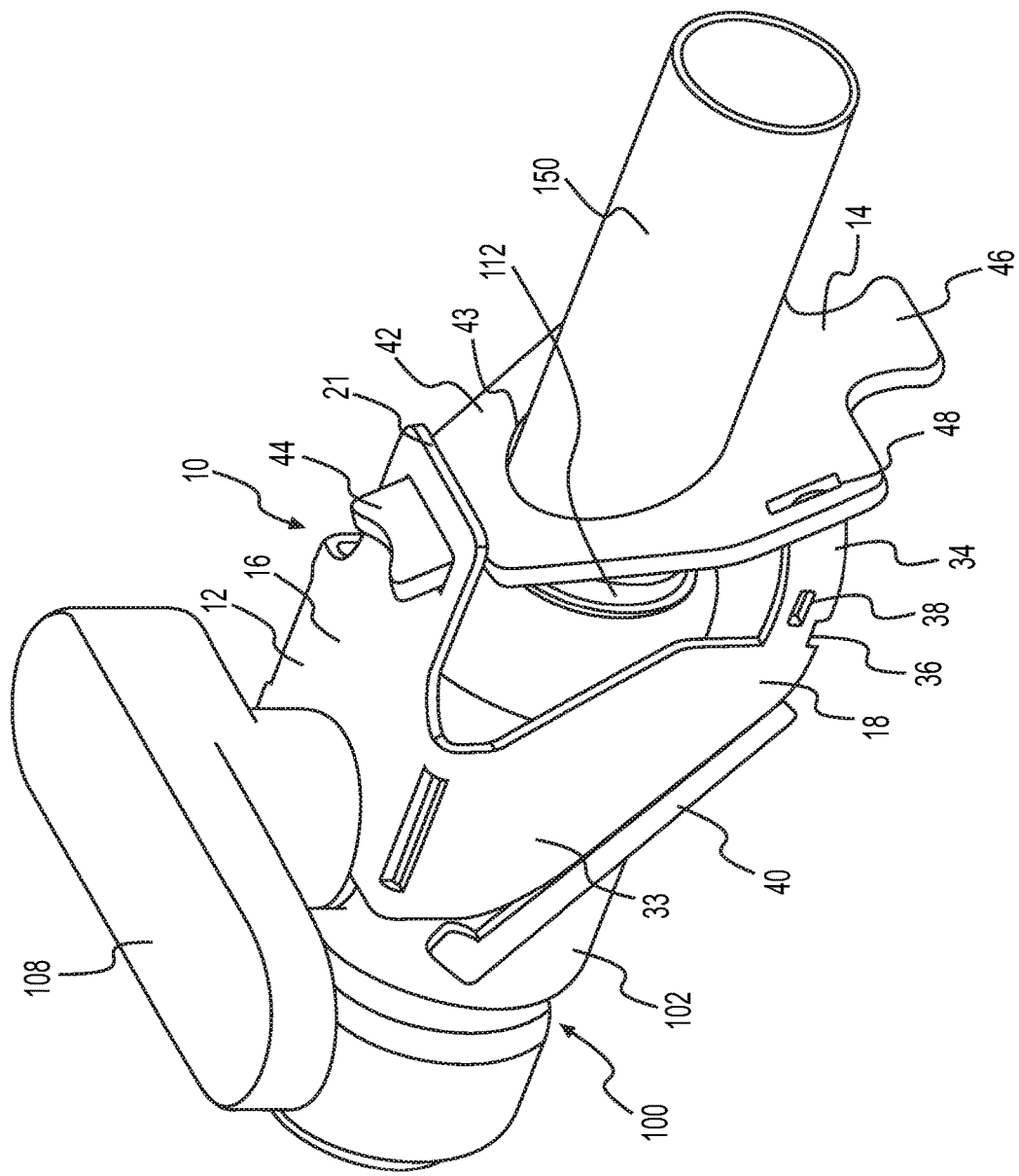
FIG. 4 is a perspective view, taken from a top, right side, of the system of FIG. 2, showing the release tool in a disengaged position.
Figure 5:
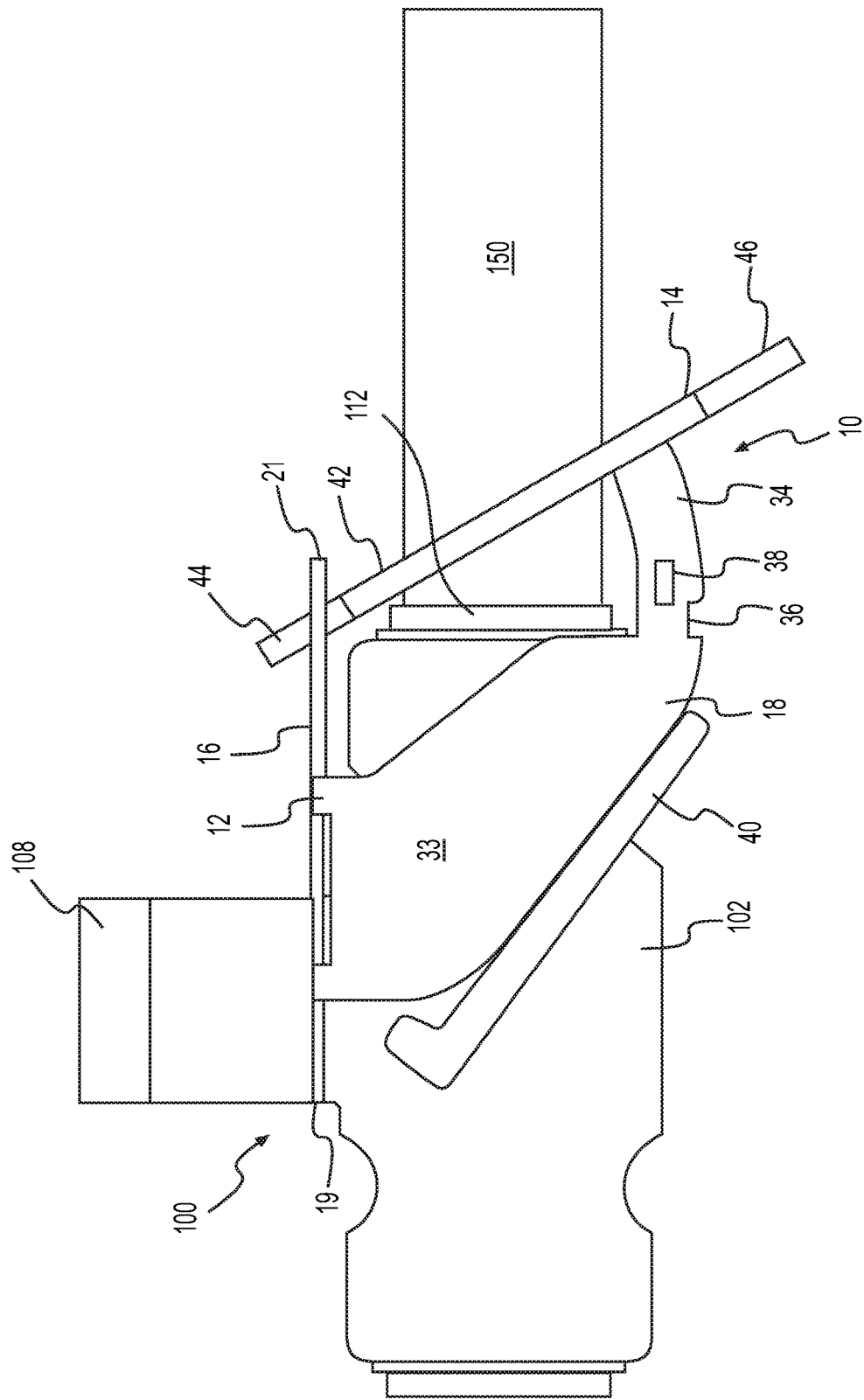
FIG. 5 is a right side elevation view of the release tool of FIG. 2, shown in the disengaged position.

The fixed member 12 and the movable member 14 may be shaped in other ways in other embodiments. For instance, FIGS. 4 and 5 show a variant of the movable member 14 in which the movable member 14 has a slightly different shape.

The manner in which the release tool 10 is used will now be described in greater detail. As mentioned above, the release tool 10 is first mounted to the valve 100 by affixing the fixed member 12 thereto. Notably, the base aperture 17 of the fixed member 12 receives the lever base 106 as described above to keep the fixed member 12 in a fixed position relative to the valve 100. Next, the movable member 14 is connected to the fixed member 12 by inserting the insert portion 44 of the movable member 14 into the connecting aperture 32 of the fixed member 12. At the same time, the end portions 34 of the guiding arms 18 are inserted into the guiding apertures 48 of the movable member 14. The movable member 14 is now in its disengaged position, illustrated in FIGS. 4 and 5. It is noted that, the release tool 10 is still mounted to the valve 100 in the disengaged position. In other words, the release tool 10 does not have to be removed from the valve 100 in order for the grab ring 114 to be retaining the conduit 150. In the disengaged position of the movable member 14, the movable member 14 is distanced away from the notches 36 of the guiding arms 18 and the movable member 14 is not applying force on the release collar 112 (i.e., is not actively forcing the release collar 112 inward into the valve passage 104). Moreover, the insert portion 44 extends from the upper end 41 of the main portion 42 by a distance sufficient for the movable member 14 to be "stuck" in the disengaged position between the conduit 150 and the peripheral wall defining the connecting aperture 32. As can be seen in FIGS. 4 and 5, the length of the end portions 34 of the guiding arms 18 also helps keep the movable member 14 in the disengaged position as the end portions 34 are still received in the apertures 48 in the disengaged position.

At this stage, with the movable member 114 in the disengaged position, the conduit 150 is connected to the valve 100 by first inserting it into the conduit aperture 43 of the movable member 14 and then into the valve passage 104 defined by the valve body 102. As the conduit 150 is inserted into the valve passage 104, the teeth of the corresponding grab ring 114 grab onto the outer side of the conduit 150 to prevent the conduit 150 from being removed from the valve passage 104.

The valve 100 and the plumbing system of which it is part can be operated normally with the release tool 10 mounted to the valve 100 in the disengaged position. As such, the release tool 10 is permanently mounted to the valve 100 during normal operation thereof and thus ready to be used at a moment's notice. This can save operational time for a user to disconnect the conduit 150 from the valve 100, particularly in cases where multiple conduits have to be disconnected from corresponding push-fit valves. Moreover, the release tool 10 is operated without any additional implement (e.g., a screw driver) thus facilitating its use.

Once the user wants to disconnect the conduit 150 from the valve 100, the user grabs the movable member 14 by the tongue portion 46 and forces it inward toward the valve 100 so as to move the movable member 14 from the disengaged position to the engaged position. The movable member 14 thus pivots, about the fulcrum formed by the insert portion 44 being in the connecting aperture 32, into the engaged position. The pivoting motion of the movable member 14 is guided by the curved end portions 34 of the fixed member 12 as the end portions 34 extend further through the movable member 14 via the guiding apertures 48. As the movable member 14 pivots toward the engaged position, part of the movable member 14 surrounding the conduit aperture 43 engages the release collar 112. If the user applies sufficient force, the resistance posed by the release collar 112 is overcome and thus the release collar 112 is pushed inwardly into the valve passage 104. As explained above, as the release collar 112 moves inwardly into the valve passage 104, it splays open the grab ring 114, thus causing the teeth of the grab ring 114 to release the conduit 150.

At this stage, the user may not necessarily want to or be able to instantly remove the conduit 150 from the valve 100. For instance, in some cases, a piece of equipment has various pipes that are each connected to a corresponding valve 100. In such cases, in order for the user to remove the piece of equipment (e.g., to perform maintenance thereof), each pipe connecting the piece of equipment to the valves 100 has to be released by the corresponding valve 100 in order to remove the piece of equipment. Therefore, the user has to simultaneously cause the grab rings 114 of each of the valves 100 to release the respective conduits—or in other words, if each of the valves 100 is mounted with a corresponding release tool 10, the movable member 14 of each release tool 10 has to be maintained in its engaged position.

The release tool 10 is operable to maintain the movable member 14 in the engaged position. Notably, the movable member 14 is selectively retained in the engaged position via interaction with the guiding arms 18—specifically, in this embodiment, through the notches 36 of the guiding arms 18. In particular, the movable member 14 is engaged with the notches 36 of the guiding arms 18 (i.e., the guiding apertures 48 are aligned with the notches 36) so that at least one of the walls forming each of the notches 36 is in contact with the movable member 14 to prevent the movable member 14 from moving back to the disengaged position. Thus, while the release collar 112 pushes against the movable member 14 so as to return to its resting position, because the movable member 14 is engaged with the notches 36, the front walls defining the notches 36 prevent the movable member 14 from moving back to the disengaged position. As will be understood, this allows maintaining the grab ring 114 in the state in which it releases the conduit 150.

Optionally, with the movable member 14 maintained in the engaged position via the notches 36, the user can then insert the key 40 into the key apertures 38 of the guiding arms 18 to ensure that, even if the movable member 14 were to accidentally disengage the notches 36, the movable member 14 would be prevented from moving from the engaged position. In particular, when the key 40 is inserted in the key apertures 38, the key 40 blocks the movable member 14 from moving back to the disengaged position.

In some embodiments, the notches 36 (or alternatively, protrusions) may be omitted and the key 40 provided as the only means to retain the movable member 14 in the engaged position. That is, in some embodiments, the movable member 14 interacts with the guiding arms 18 through the key 40 to prevent disengagement of the movable member 14 from the engaged position.

Once the conduit 150 is disconnected from the valve 100, the key 40 can be removed (if it was in fact used to secure the movable member 14 in place) from the key apertures 38, and the movable member 14 is removed from the notches 36 of the guiding arms 18. The release collar 112 thus springs back to its resting position which pushes the movable member 14 back to the disengaged position.

As will be understood from the above, the release tool 10 not only provides an easy way to disconnect the conduit 150 from the push-fit valve 100 but also allows the user to selectively cause the grab ring 114 of a given port 110 of the valve 100 to be maintained in an "unlocked" state whereby the grab ring 114 releases the conduit 150 and thus allows its disconnection from the valve 100. The ability to easily and quickly maintain the grab ring 114 in the unlocked state via the release tool 10 can be particularly important in applications in which a piece of equipment includes multiple pipes or hoses connected to various push-fit valves, since, if each valve is mounted with a release tool 10, the user can operate each release tool 10 to maintain a grab ring 114 of each valve in the unlocked state thereby allowing a single person to remove the piece of equipment without any help. This is in contrast to conventional release tools for push-fit valves which typically require a user to manually keep a clamp or clip pushed into the valve to remove a conduit.

In addition to the simplicity of operation of the release tool 10 and its capability to maintain the grab ring 114 of a port 110 of the push-fit valve 100 in the unlocked state, the release tool 10 is relatively inexpensive to produce. Notably, the fixed member 12 and the movable member 14 are sheet metal components. That is, each of the fixed member 12 and the movable member 14 is made from a single piece of sheet metal. In this embodiment, the metallic material of the fixed member 12 and the movable member 14 is aluminum. Other materials are also contemplated.

With reference to FIG. 6, in order to produce the fixed member 12, a piece of sheet metal approximately 1.5 mm in thickness is cut into shape and then bent to obtain the fixed member 12 in its finished state. Thus, the different portions of the fixed member 12 are each approximately 1.5 mm thick. FIG. 6 illustrates the fixed member 12 in a pre-bending state, as initially laser cut. As can be seen, the key 40 is cut together with the fixed member 12, joined to one of the guiding arms 18. The key 40 can then be separated from the fixed member 12 by hand. Moreover, a spare key 140, identical to the key 40 is also cut together with the fixed member 12, joined to the other guiding arm 18. The spare key 140 can thus be separated from the fixed member 12 if the key 40 is lost.

In order to obtain the finished fixed member 12, the cut piece of sheet metal is bent into shape. Notably, the guiding arms 18 are portions of the fixed member 12 that are bent relative to the central portion 16. To that end, in this embodiment, the fixed member 12 includes two bending cuts 55, each disposed between the central portion 16 and a corresponding one of the guiding arms 18, to facilitate bending the guiding arms 18 relative to the central portion 16. In this embodiment, the guiding arms 18 are bent manually relative to the central portion 16 (also facilitated by the choice of material and the small thickness of the sheet metal).

For its part, the movable member 14 is produced simply by cutting a piece of sheet metal into shape and does not require any bending, further facilitating the manufacturing of the release tool 10. As such, the conduit aperture 43 and the guiding apertures 48 are defined in a common planar portion of the movable member 14 (i.e., the same flat section of the movable member 14). Thus, in this embodiment, a majority, and more specifically an entirety, of the movable member 14 is planar.

Furthermore, in order to ensure that the peripheral wall defining the conduit aperture 43 does not scratch and thereby damage the conduit 150 which could potentially cause a leak, the conduit aperture 43 is formed so as to ensure that it is not burred. In particular, when the movable member 14 is laser cut from a piece of sheet metal, the conduit aperture 43 is formed by initiating a cut at a point P (FIG. 7) that is distanced from the peripheral wall which will form the conduit aperture 43. From the point P, the cut is continued along line 49 (shown in dashed lines) to a point along a path that defines the peripheral wall of the conduit aperture 43. The cut then continues to form the peripheral wall of the conduit aperture 43 and comes back along line 49 to the point P. This ensures a burr-free conduit aperture 43 obtained without further processing (i.e., without a deburring step).

Because the movable member 14 is subjected to significant compressive forces as it is being moved to the engaged position (against the resistance of the release collar 112), the thickness of the movable member 14 is greater than the thickness of the fixed member 12. In other words, the sheet metal from which the movable member 14 is made is thicker than that of the fixed member 12. For instance, a ratio of the thickness of the movable member 14 over the thickness of the fixed member 12 may be between 1.2 and 2.5. In this embodiment, the ratio of the thickness of the movable member 14 over the thickness of the fixed member 12 is 2. That is, in this embodiment, the thickness of the movable member 14 is approximately 3 mm.

As will be appreciated, because of the inexpensive costs of production of the release tool 10, an operator can consider providing multiple release tools 10 mounted to corresponding push-fit valves (e.g., in a plant) at a low cost.

It is contemplated that a distributor could provide a system including the push-fit valve 100 and the release tool 10 for distribution.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A release tool for use with a push-fit valve, the valve having a valve body defining a valve passage and a grab ring for retaining a conduit in fluid connection with the valve passage, the release tool comprising:
   a fixed member configured to be affixed to the valve, the fixed member comprising:
      a central portion defining a base aperture configured to receive therein a lever base of the valve, the base aperture being shaped such that, when the lever base of the valve is received in the base aperture, the central portion is rotatably fixed relative to the valve; and
      at least one guiding arm extending from a side of the central portion so that the at least one guiding arm extends along a side of the valve body when the release tool is mounted to the valve;
   and
   a movable member movably connected to the fixed member, the movable member being movable relative to the fixed member between a first position and a second position, the movable member defining:
      a conduit aperture configured for the conduit to extend therethrough during use, the conduit aperture being shaped and sized so as to permit the movable member to abut a part of the valve during use; and
      at least one guiding aperture receiving the at least one guiding arm of the fixed member;
   wherein, during use, in order to disconnect the conduit from the valve, the movable member is moved from the first position to the second position to push the part inwardly into the valve and thereby cause the grab ring of the valve to release the conduit, the movable member being selectively retained in the second position via interaction between the movable member and the at least one guiding arm.

2. The release tool of claim 1, wherein:
   the conduit aperture is oblong; and
   the conduit aperture has a diameter that is configured to be greater than a diameter of the conduit.

3. The release tool of claim 1, wherein:
   the at least one guiding arm defines a notch; and
   the movable member engages the notch and thereby interacts with the at least one guiding arm through the notch thereof to retain the movable member in the second position.

4. The release tool of claim 1, wherein the movable member is pivotable relative to the fixed member between the first and second positions.

5. The release tool of claim 4, wherein a portion of the at least one guiding arm is curved so as to guide pivoting motion of the movable member between the first and second positions.

6. The release tool of claim 1, wherein:
   the central portion of the fixed member defines a connecting aperture;
   the movable member has an insert portion that is inserted into the connecting aperture so as to pivotably connect the movable member to the fixed member; and
   the connecting aperture is shaped and sized so as to permit the insert portion of the movable member to pivot therein.

7. The release tool of claim 6, wherein the connecting aperture is generally rectangular.

8. The release tool of claim 1, wherein the fixed member and the movable member are sheet metal components.

9. The release tool of claim 8, wherein the at least one guiding arm is a portion of the fixed member that is bent relative to the central portion.

10. The release tool of claim 1, wherein the conduit aperture and the at least one guiding aperture of the movable member are defined in a common planar portion of the movable member.

11. The release tool of claim 1, wherein the release tool is configured to remain mounted to the valve both in the first and second positions.

12. The release tool of claim 1, wherein:
   the at least one guiding arm includes a first guiding arm and a second guiding arm;
   the first guiding arm extends from a first side of the central portion;
   the second guiding arm extends from a second side of the central portion opposite the first side;
   the first and second guiding arms at least partially straddle the valve body of the valve when the release tool is mounted to the valve;
   the at least one guiding aperture includes a first guiding aperture and a second guiding aperture;
   the first guiding aperture receives the first guiding arm;
   the second guiding aperture receives the second guiding arm;
   the first guiding arm of the fixed member defines a key aperture extending therethrough;
   the second guiding arm of the fixed member defines a key aperture extending therethrough; and
   the release tool further comprises a key that is configured to be inserted through the key apertures of the first and second guiding arms when the movable member is in the second position to block the movable member from moving back to the first position.

13. The release tool of claim 1, wherein the base aperture includes a circular portion and a rectangular portion extending therefrom, the rectangular portion of the base aperture being shaped and sized to receive a key portion of the lever base therein so as to prevent rotation of the fixed member relative to the valve.

14. The release tool of claim 1, wherein the part of the valve that is abutted by the movable member is a release collar, the movable member being moved from the first position to the second position to push the release collar inwardly into the valve.

15. A system comprising:
   the release tool of claim 1; and a push-fit valve comprising:
  a valve body defining a valve passage therein, the valve body having a lever base on an outer side of the valve body;
  a lever rotatably connected to the lever base;
a grab ring at least partly received in the valve passage, the grab ring being configured to retain a conduit inserted into the valve passage; and
a release collar movable inwardly into and outwardly of the valve passage, the release collar being the part of the valve that is abutted by the release collar during use.

\* \* \* \* \*